United States Patent
Sorrentino (10) Patent No.: US 10,779,250 B2
(45) Date of Patent: *Sep. 15, 2020

(54) METHOD AND APPARATUS FOR TRANSMITTING DEVICE-TO-DEVICE (D2D) SYNCHRONIZATION SIGNALS

(71) Applicant: TELEFONAKTIEBOLAGET LM ERICSSON (PUBL), Stockholm (SE)

(72) Inventor: Stefano Sorrentino, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/100,701

(22) Filed: Aug. 10, 2018

(65) Prior Publication Data

US 2018/0352522 A1 Dec. 6, 2018

Related U.S. Application Data

(63) Continuation of application No. 15/143,812, filed on May 2, 2016, now Pat. No. 10,075,930.

(Continued)

(51) Int. Cl.
*H04W 56/00* (2009.01)
*H04W 76/14* (2018.01)
*H04W 8/00* (2009.01)

(52) U.S. Cl.
CPC ..... *H04W 56/001* (2013.01); *H04W 56/0025* (2013.01); *H04W 8/005* (2013.01); *H04W 76/14* (2018.02)

(58) Field of Classification Search
None
See application file for complete search history.

(56) References Cited

U.S. PATENT DOCUMENTS 9,756,672 B2   9/2017  Wu et al.
10,075,930 B2* 9/2018  Sorrentino ........ H04W 56/0025
                                               370/328

(Continued)

FOREIGN PATENT DOCUMENTS

CN   103442442 A   12/2013
CN   103906266 A    7/2014

(Continued)

OTHER PUBLICATIONS

ZTE, "Discussions on D2D UE-to-network Relay", 3GPP TSG-RAN WG1 Meeting #80bis, Belgrade, Serbia, R1-151725, pp. 1-6, Apr. 20-24, 2015.

(Continued)

*Primary Examiner* — Anh Vu H Ly (57) ABSTRACT

A method and apparatus in a first User Equipment (UE) that reduces the number of required transmissions when transmitting device-to-device (D2D) synchronization signals or broadcast channels in a wireless network. The first UE determines its level of interest in being received by a second UE that is within network coverage, and adapts a time pattern for transmission of synchronization signals or broadcast channels, depending on the determined level of interest of the first UE. The first UE's interest may be determined by analyzing a type of service that the first UE is interested in performing, and concluding the first UE is interested in being received by the second UE only when the first UE is interested in performing a certain type of service.

13 Claims, 4 Drawing Sheets

Related U.S. Application Data (60) Provisional application No. 62/156,662, filed on May 4, 2015.

(56) References Cited

U.S. PATENT DOCUMENTS

| | | | |
|---|---|---|---|
| 2014/0162544 A1* | 6/2014 | Edge | H04W 8/005 455/3.01 |
| 2014/0220895 A1* | 8/2014 | Wei | H04W 4/70 455/41.2 |
| 2014/0323126 A1 | 10/2014 | Ro et al. | |
| 2015/0049635 A1 | 2/2015 | Lee | |
| 2015/0339718 A1* | 11/2015 | Walton | G06Q 30/0214 705/14.16 |
| 2016/0249183 A1* | 8/2016 | Kim | H04W 4/06 370/328 |
| 2016/0249266 A1* | 8/2016 | Kim | H04W 4/06 370/328 |
| 2017/0230940 A1* | 8/2017 | Jung | H04W 76/14 |
| 2017/0273064 A1* | 9/2017 | Adachi | H04W 4/08 370/328 |

FOREIGN PATENT DOCUMENTS

| | | |
|---|---|---|
| CN | 103945497 A | 7/2014 |
| CN | 104284404 A | 1/2015 |
| WO | 2014/175712 A1 | 10/2014 |

OTHER PUBLICATIONS

LG Electronics Inc., "UE AS-UE ProSe protocol interaction for keeping announcements", 3GPP TSG-RAN WG2 Meeting #89, Athens, Greece, R2-150543, pp. 1-4, Feb. 9-13, 2015.

Kyocera, "eNB related D2D Synchronization Procedure", 3GPP TSG RAN WG1 Meeting #79bis, Ljubljana, Slovenia, R1-143967, pp. 1-5, Oct. 6-10, 2014.

Ericsson, Considerations on out of coverage discovery synchronization, 3GPP TSG-RAN WG1 Meeting #88bis, R1-151762, Belgrade, Serbia, Apr. 20-24, 2015.

Nokia, et al., D2D Synchronization—Out of network coverage/partial network cove, 3GPP TSG-RAN WG1 Meeting #74, R1-133496, Barcelona, Spain, Aug. 19-23, 2013.

* cited by examiner

FIG. 6

METHOD AND APPARATUS FOR TRANSMITTING DEVICE-TO-DEVICE (D2D) SYNCHRONIZATION SIGNALS

CLAIM OF PRIORITY

This application is a Continuation of U.S. patent application Ser. No. 15/143,812 filed on May 2, 2016, now U.S. Pat. No. 10,075,930, which claims the benefit of U.S. Provisional Application No. 62/156,662 filed on May 4, 2015. The entire contents of each of these applications are hereby incorporated herein by reference for all purposes.

TECHNICAL FIELD

The present disclosure relates to a method and an apparatus for transmitting device-to-device (D2D) synchronization signals or broadcast channels, and more particularly, for transmitting D2D synchronization signals for multihop support.

BACKGROUND D2D Discovery

D2D discovery consists of an application where user equipments (UEs) sense each other's presence based on detection of discovery messages periodically broadcasted by the UEs. Each UE typically transmits one or more discovery messages within configured resources (discovery resource pool). Discovery resource pools may be different across cells, and the discovery resource pools may be offset in time due also to synchronization differences between cells. This feature of discovery resource pools implies that UEs in one cell need to synchronize to the pools provided by other cells in order to detect the associated discovery messages. One way of providing this synchronization is to associate pools with synchronization signals that are particularly suitable for the purpose.

Typical resource allocation for discovery includes a discovery period that may be several seconds long. Within the discovery period, each discovery pool typically spans a small fraction of resources. The discovery resources should be almost contiguous in time for energy efficiency reasons. The resource pool may only span a few tens or hundreds of milliseconds within the discovery period.

D2D Synchronization Signal (D2DSS)

Traditional communication in terrestrial radio networks is via links between User Equipments (UEs) and base stations. However, when two UEs are in the vicinity of each other, direct device-to-device (D2D) communication may be considered. Such D2D communication may be dependent on synchronization information from (1) a base station, (2) a different node such as a cluster head (CH) (i.e., a UE acting as a synchronization source) providing local synchronization information, or (3) a UE enabled to relay synchronization information from a different synchronization source. An eNB/CH is used as the synchronization source for intra-cell/cluster communication. Relayed synchronization signals are used for inter-cell/cluster communication.

Figure 1:
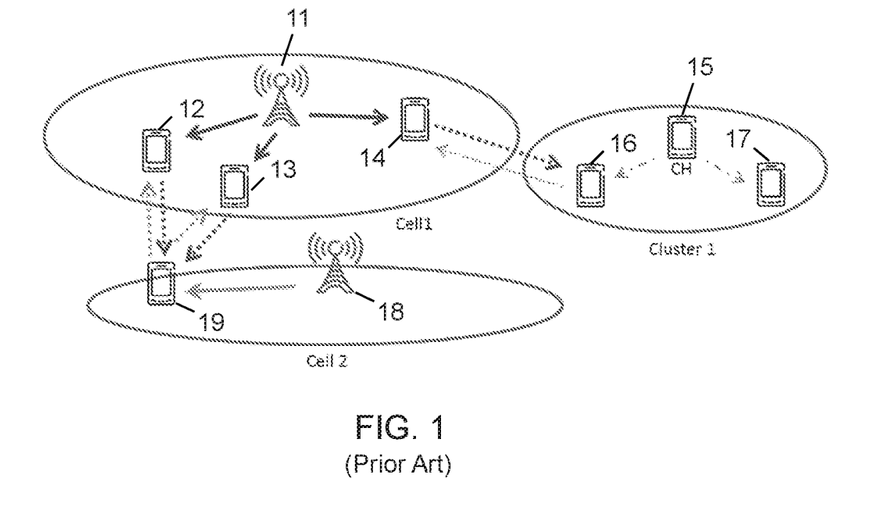
FIG. 1 (Prior Art) is an illustrative illustration of a cellular network in which different nodes act as synchronization sources.

FIG. 1 is an illustrative illustration of a cellular network in which different nodes act as synchronization sources. Within Cell-1, an eNB 11 provides synchronization information to UEs 12-14. Within Cluster-1, UE 15 acts as a Cluster Head (CH) to provide synchronization information to UEs 16 and 17. Note that UE 14 in Cell-1 and UE 16 in Cluster-1 may also act as relays to send synchronization information between Cell-1 and Cluster-1. Within Cell-2, an eNB 18 provides synchronization information to UE 19.

UEs 12, 13, and 19 may act as relays to exchange synchronization information between Cell-1 and Cell-2.

For in-coverage D2D scenarios, the synchronization reference is provided by the eNB. The eNB signals the D2D resource pool to indicate the resource used for D2D. For out-of-coverage D2D scenarios, the CH provides the synchronization reference.

The signal design of D2D synchronization signals (D2DSS) is under discussion in 3GPP. One proposed solution consists of differentiating D2DSS into two sets: one set intended to support D2D discovery and the other set intended to support D2D communication.

Synchronization signals are typically periodic. The reason is that oscillators tend to drift from their nominal value and periodic corrections based on received synchronization are needed to maintain relative synchronization. Typical synchronization periodicity may be from a few milliseconds to tens or hundreds of milliseconds.

During Long Term Evolution (LTE) Rel-12 standardization, a distributed synchronization protocol was defined for D2D, where devices derive their transmit synchronization reference either from an eNB (when in coverage), from another device (when out of coverage), or autonomously when they are isolated. Synchronization signals/channels transmitted by an in-coverage device include information that the original synchronization reference is from an eNB. Out of coverage devices that detect SLSS from an in-coverage device prioritize synchronization to such reference, under a number of radio conditions that are not relevant for this disclosure. As a consequence, devices that are just outside eNB coverage are likely using a transmit synchronization reference originally from the eNB, even though they are synchronized to another in-coverage device.

SUMMARY

Transmission of periodic and frequent (e.g., 40 ms) synchronization signals enables devices to synchronize to each other and enables direct communication and/or discovery between the devices. When out-of-coverage (OoC) wireless devices (including so-called Machine Type Communications (MTC) devices) try to communicate with an in-coverage (InC) wireless device (for example to establish a relayed connection to an eNB), the OoC devices transmit periodic synchronization signals to allow the InC device to receive their data or discovery channels. However, D2D signals transmission drains the device battery significantly and, in particular, may impact the autonomy of MTC devices significantly.

A method and apparatus for transmitting device-to-device (D2D) synchronization signals that reduces the number of required transmissions is needed. The present disclosure provides such a method and apparatus. An exemplary embodiment of the present disclosure includes:

(1) Determining, at a first device, an interest in being received by a second device; and (2) Depending on the above interest, the first device adapts the time pattern for synchronization signals and broadcast channel transmission. In one special case, such signals and channels are not transmitted at all.

The disclosure provides different ways of determining the first device's interest in being received by a second device that uses the same or a different synchronization reference, including analysis of the type of service that the first device is interested in performing, analysis of the coverage states of the first device and the second device, and analysis of the node providing the original synchronization reference used by the second device.

One embodiment provides a method in a first User Equipment (UE) for transmitting device-to-device (D2D) synchronization signals or broadcast channels in a wireless network. The method includes determining, at the first UE, the first UE's level of interest in being received by a second UE that uses the same or a different synchronization reference; and adapting, at the first UE, a time pattern for transmission of synchronization signals or broadcast channels, depending on the determined level of interest of the first UE. In a particular embodiment, method includes determining the first UE's level of interest in being received only by a second UE that is within network coverage.

Another embodiment provides an apparatus in a first UE for transmitting D2D synchronization signals or broadcast channels in a wireless network. The apparatus includes a transceiver and a processor coupled to a non-transitory memory that stores computer program instructions. When the processor executes the instructions, the processor controls an interest determining circuit configured to determine the first UE's level of interest in being received by a second UE that uses the same or a different synchronization reference, and a transmission time pattern adapting circuit configured to adapt a time pattern for transmission of synchronization signals or broadcast channels, depending on the determined level of interest of the first UE. In a particular embodiment, the apparatus is configured to determine the first UE's level of interest in being received only by a second UE that is within network coverage.

Another embodiment provides a system for adapting a first UE's transmission time pattern for transmitting D2D synchronization signals or broadcast channels in a wireless communication network, wherein the first UE is operating outside a coverage area of an eNodeB in the wireless communication network. The system includes an apparatus in the first UE, comprising a processor that executes computer program instructions stored in a non-transitory memory; an interest determining circuit controlled by the processor and configured to determine the first UE's level of interest in being received by a second UE that uses the same or a different synchronization reference; and a transmission time pattern adapting circuit controlled by the processor and configured to adapt a time pattern for transmission of synchronization signals or broadcast channels, depending on the determined level of interest of the first UE. The system also includes a second UE that provides a relay to the eNodeB. In a particular embodiment, the apparatus is configured to determine the first UE's level of interest in being received only by a second UE that is within network coverage.

Embodiments allow for the optimization of synchronization signals, resulting in energy and overhead advantages. Further features and benefits of embodiments of the invention will become apparent from the detailed description below.

BRIEF DESCRIPTION OF THE DRAWINGS

In the following section, the invention will be described with reference to exemplary embodiments illustrated in the figures, in which.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements. Additionally, it should be understood that the invention can be implemented in hardware or a combination of software stored on a non-transitory memory and executed by a general purpose computer or microprocessor.

The disclosure that follows uses LTE terminology, but the disclosure is equally applicable to other standards. The terms "UE", "wireless device", and "wireless communication device" are used with the same meaning. Likewise, an eNodeB (eNB) may be alternatively construed as a base station or wireless access point. When a first UE discovers a second UE that is "in-coverage (InC)" or "within NW coverage", the second UE is operating within the coverage area of the same eNB as the first UE or some other eNB within a wireless communication network.

Different options are provided herein for transmitting direct Sidelink Synchronization Reference Signals (SLSS) and/or associated Physical Sidelink Broadcast Control Channels (PSBCH), including as examples:

(1) No SLSS/PSBCH transmission. This implies that a receiving UE is not able to use SLSS/PSBCH from a transmitting UE for acquisition of synchronization and system information useful for receiving other channels from the transmitting UE.

(2) SLSS/PSBCH are periodically transmitted, e.g., every 40 ms. The receiving UE is able to efficiently detect new UEs in proximity by periodically scanning at least an SLSS transmission period.

(3) SLSS/PSBCH are transmitted only once, or a limited number of times, just before and/or during and/or after a repetition of a set of resources for D2D transmission, such as the so called discovery resource pool. In this case, a receiving UE may exploit SLSS/PSBCH for enhancing its synchronization accuracy, but some knowledge about when in time such SLSS/PSBCH transmissions are expected to occur is needed in order to avoid continuous scanning at the receiving UE.

Even though the embodiments described below are general, one exemplary embodiment for D2D communications is so-called UE-Network (UE-NW) relaying, where a remote device that is out of eNB coverage but still relatively close to UEs within coverage establishes a relayed connection to the eNB via an in-coverage UE. A number of procedures have been proposed for establishing such connection and selecting the appropriate "relay UE" for a given remote UE. Some of these procedures rely on an exchange of control information (using the discovery or communication physical D2D channels) between the remote UE and the relay UE. In one embodiment, the remote UE is an MTC device, or in general a UE with tight energy constraints.

As noted above, during LTE Rel-12 standardization, a distributed synchronization protocol was defined for D2D, where devices derive their transmit synchronization reference either from an eNB (when in coverage), from another device (when out of coverage), or autonomously when they are isolated. Synchronization signals/channels transmitted by an InC device include information that the original synchronization reference is from an eNB. OoC devices that detect SLSS from an InC device prioritize synchronization to such reference, under a number of radio conditions that are not relevant for this disclosure. As a consequence, devices that are just outside eNB coverage are likely using a transmit synchronization reference originally from the eNB, even though they are synchronized to an InC device.

In order to enable a UE to synchronize with an OoC device, the OoC device may periodically transmit SLSS/PSBCH (e.g., every 40 ms) to allow the UE to efficiently identify new synchronization sources and track their channels. On the other hand, such continuous periodic transmission affects power consumption in the OoC device.

An alternative solution is to transmit aperiodic SLSS/PSBCH, for example close to repetitions of a discovery resource pool. Pool repetitions may be widely separated in time (on the order of seconds) and the receiver would need to scan the radio environment for a significant period of time in order to detect an incoming D2D signal.

While for certain scenarios, periodic SLSS/PSBCH transmission is unavoidable, the embodiments herein include rules for reducing the number of SLSS/PSBCH transmissions (as compared to continuous periodic) without adversely affecting the receiver implementation or performance as compared to LTE Rel-12. At the transmitter, the advantage is reduced power consumption.

This disclosure focuses on the case where a UE is outside the coverage of an eNB but is synchronized to an in-coverage (InC) UE. The OoC UE can determine that its synchronization reference is derived from the eNB by reading the SLSS/PSBCH received from the InC UE. It is assumed that the remote OoC UE is only interested in being received by InC UEs, for example for the purpose of establishing a relayed route to the eNB. The InC UE tracks discovery resources aligned to the eNB timing in order to participate in InC discovery. Therefore, it is not necessary for the remote OoC UE to transmit periodic SLSS/PSBCH in order to be detected by InC UEs.

The embodiments disclosed herein include rules for determining when to transmit periodic SLSS/PSBCH, when to perform aperiodic SLSS/PSBCH transmission, or when to not transmit SLSS/PSBCH at all. Such rules may be specified in a standard or they may be implemented in the UE. It is understood that, in general, a UE will transmit SLSS/PSBCH (with the periodicity described in this disclosure) only as long as it is interested in participating in D2D communications.

In LTE terms, it is further noted that Behavior 1 (Rel-12 discovery behavior) is sufficient to allow discovery between UEs that use the same synchronization reference. In other cases, when the OoC UE is interested in being detected by another UE that may use a different synchronization reference, Behavior 2 (Rel-13 communication behavior) is needed. At least for UE-NW relay discovery, Temporary Mobile Group Identity (TMGI) advertisement, and Cell ID announcement, the OoC UE is only interested in mutual discovery with other InC UEs.

Figure 2:
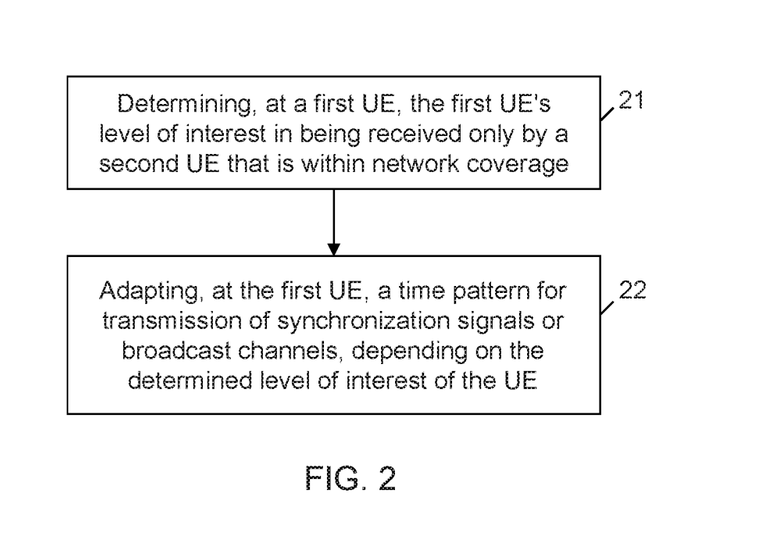
FIG. 2 is a process flow diagram of an exemplary embodiment of an overall method according to the present disclosure.

FIG. 2 is a process flow diagram of an exemplary embodiment of an overall method according to the present disclosure, wherein a UE 21 adapts its time pattern for transmission of synchronization signals or broadcast channels. At step 21, the UE determines its level of interest in being received only by another, second UE that is within network coverage. The second UE may use the same or a different synchronization reference. At step 22, the UE adapts its time pattern for transmission of synchronization signals or broadcast channels, depending on the determined level of interest of the UE.

Figure 3:
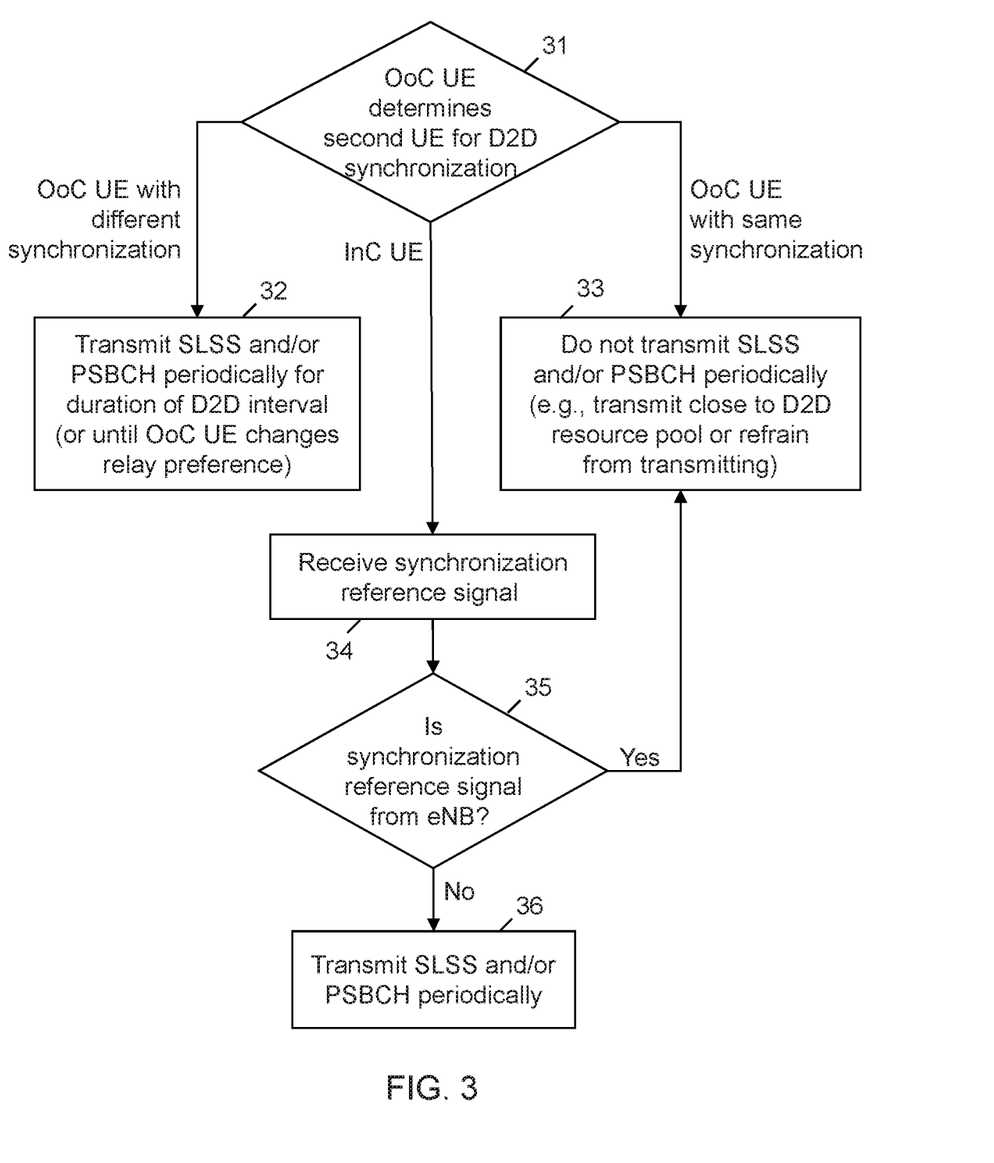
FIG. 3 is a process flow diagram of an exemplary embodiment of a method for an OoC UE to determine whether to transmit SLSS and/or PSBCH periodically.

FIG. 3 is a process flow diagram of an exemplary embodiment of a method for an OoC UE to determine whether or not to transmit SLSS and/or PSBCH periodically. This determination may be made based on the OoC UE's interest in being received by various other UEs. The OoC UE's level of interest may be determined, for example, by analyzing a type of service that the OoC UE desires to perform, and determining whether a second UE is compatible with the type of service. The UE is interested only when the second UE is compatible with the type of service the OoC UE desires to perform.

Alternatively, the OoC UE's level of interest may be determined, for example, by determining whether the second UE is inside a coverage area of an eNodeB. When the second UE is inside the coverage area of the eNodeB, the OoC UE determines whether the second UE is capable of relaying a synchronization reference that originated from the eNodeB. When the second UE is capable of relaying the synchronization reference that originated from the eNodeB, the UE is interested if the UE desires to synchronize with the eNodeB.

At step 31, the OoC UE determines a second UE to utilize for D2D synchronization. In a first exemplary scenario, the UE determines that it is interested in being received only by OoC UEs using a different synchronization reference. In this scenario, the method moves from step 31 to step 32 where the OoC UE transmits SLSS and/or PSBCH periodically for the duration of the D2D interval (or until the OoC UE changes its relay preference).

In a second scenario, the OoC UE determines that it is interested in being received only by OoC UEs using its same synchronization reference, such as a UE in the same cluster as the OoC UE. In this scenario, the method moves instead from step 31 to step 33 where the OoC UE does not transmit SLSS and/or PSBCH periodically. The OoC UE may, for example, transmit the SLSS and/or PSBCH only at a time close to the D2D resource pool, or it may not transmit the SLSS or PSBCH at all.

In a third scenario, the OoC UE determines that it is interested in being received only by InC UEs. In this scenario, the method moves instead from step 31 to step 34 where the OoC UE receives the synchronization reference signal from the second UE. At step 35, the OoC UE determines whether the synchronization reference is originally derived from an eNB. This can be done by reading incoming synchronization signals and control information (for example by reading the Primary Synchronization Signal/Secondary Synchronization Signal (PSS/SSS), Physical Broadcast Control Channel (PBCCH), Sidelink Synchronization Reference Signals (SLSS), Physical Sidelink Broadcast Channel (PSBCH), and the like). If the synchronization reference is originally derived from an eNB, the method moves from step 35 to step 33 where the OoC UE does not transmit SLSS and/or PSBCH periodically. The OoC UE may, for example, transmit the SLSS and/or PSBCH only at a time close to a D2D resource pool, or it may not transmit the SLSS or PSBCH at all. However, if the OoC UE determines that the synchronization reference is not originally derived from an eNB, the method moves instead from step 35 to step 36 where the OoC UE transmits SLSS and/or PSBCH periodically.

In FIG. 3, the order of steps is not implied by the figure. For example, the UE may receive synchronization reference signals from the eNB before determining a UE for D2D synchronization. Other conditions such as the UE coverage state may be considered in the rules for determining the SLSS/PSBCH transmission behavior.

In LTE terms, this means an OoC UE that is synchronized to an InC UE follows Rel-12 Behavior 1 (one-shot SLSS/PSBCH transmission) if it is participating in either UE-NW relay discovery, TMGI advertisement, or Cell ID announcement. Otherwise, the UE follows Behavior 2 (periodic SLSS/PSBCH transmission). In Behavior 2, a UE in each discovery period in which UE transmits discovery, transmits SLSS every 40 ms. Additionally, actual SLSS transmission is subject to other Rel-12 conditions such as Wireless Access Network (WAN) prioritization. The UE also transmits PSBCH in the same subframe of SLSS transmission. The same content as PSBCH for Rel-13 communication UEs is used. The present disclosure addresses issues such as whether the UE transmits SLSS if it does not transmit a discovery message in a given discovery period, whether reserved bits of the PSBCH are used in Rel-13, and the issue of when the UE follows each behavior.

The method of the present disclosure may be utilized by UEs that are in partial network coverage or are outside network coverage in order to obtain a network connection that would otherwise be unavailable. In one embodiment, the method is used for public safety discovery by a UE that is outside network coverage.

Figure 4:
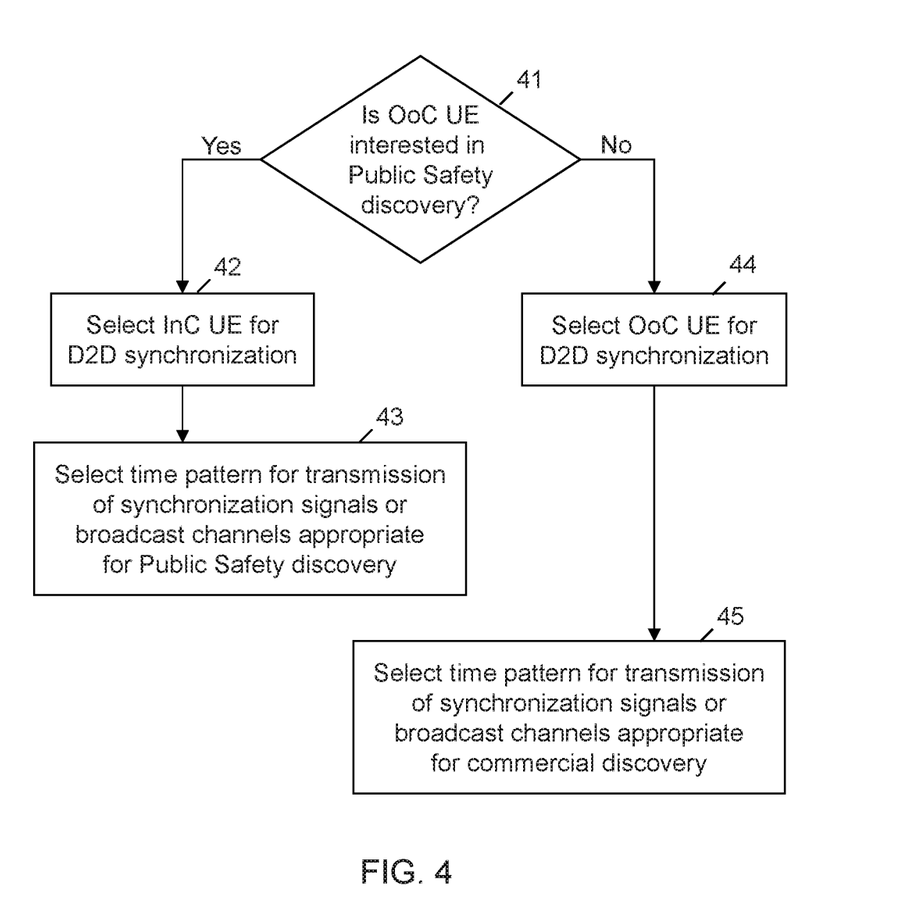
FIG. 4 is a process flow diagram of an exemplary embodiment of a method for an OoC UE to select a time pattern for transmission of synchronization signals or broadcast channels when the UE is interested in either Public Safety discovery or commercial discovery.

FIG. 4 is a process flow diagram of an exemplary embodiment of a method for an OoC UE to select a time pattern for transmission of synchronization signals or broadcast channels when the OoC UE is interested in either Public Safety discovery or commercial discovery. At step 41, it is determined whether the OoC UE is interested in Public Safety discovery. If so, the method moves to step 42 where the OoC UE selects an InC UE for D2D synchronization. At step 43, the OoC UE selects a time pattern for transmission of synchronization signals or broadcast channels appropriate for Public Safety discovery. However, if it is determined at step 41 that the OoC UE is not interested in Public Safety discovery (i.e., the OoC UE is interested in commercial discovery), the method moves instead to step 44 where the OoC UE selects another OoC UE for D2D synchronization. At step 45, the OoC UE selects a time pattern for transmission of synchronization signals or broadcast channels appropriate for commercial discovery.

System

Although the described solutions may be implemented in any appropriate type of telecommunication system supporting any suitable communication standards and using any suitable components, particular embodiments of the described solutions may be implemented in an LTE network, such as that illustrated in FIG. 1.

As shown in FIG. 1, the example network may include one or more instances of wireless communication devices (e.g., conventional user equipment (UEs), D2D UEs, machine type communication (MTC)/machine-to-machine (M2M) UEs) and one or more radio access nodes (e.g., eNodeBs or other base stations) capable of communicating with these wireless communication devices along with any additional elements suitable to support communication between wireless communication devices or between a wireless communication device and another communication device (such as a landline telephone). Although the illustrated wireless communication devices may represent communication devices that include any suitable combination of hardware and software, these wireless communication devices may, in particular embodiments, represent devices such as the example wireless communication device illustrated in greater detail by FIG. 5. Similarly, although the illustrated radio access node may represent network nodes that include any suitable combination of hardware and software, these nodes may, in particular embodiments, represent devices such as the example radio access node illustrated in greater detail by FIG. 6.

Wireless Communication Device

Figure 5:
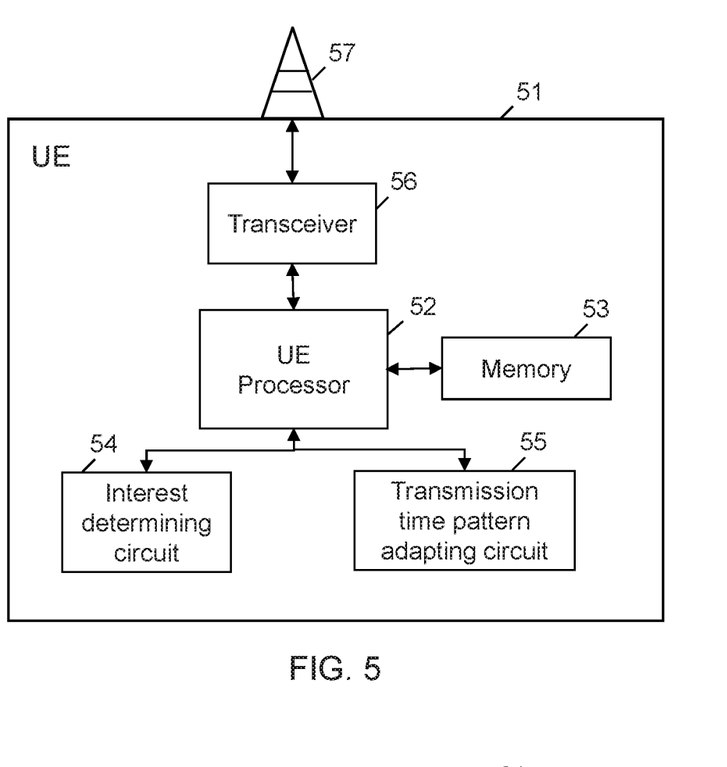
FIG. 5 is a schematic diagram of a UE in an exemplary embodiment of the present disclosure.

As shown in FIG. 5, the example wireless communication device (UE 51) includes a UE processor 52 coupled to a memory 53. When the processor executes computer program instructions stored in the memory, the processor is caused to control an interest determining circuit 54 and a transmission time pattern adapting circuit 55. The processor also controls a transceiver 56, which transmits and receives radio frequency (RF) signals through an antenna 57. In particular embodiments, some or all of the functionality described above as being provided by UEs, MTC or M2M devices, and/or any other types of wireless communication devices may be provided by the device processor executing instructions stored on a computer-readable medium, such as the memory shown in FIG. 5.

Alternative embodiments of the wireless communication device may include additional components beyond those shown in FIG. 5 that may be responsible for providing certain aspects of the device's functionality, including any of the functionality described above and/or any functionality necessary to support the solution described above.

Radio Access Node

Figure 6:
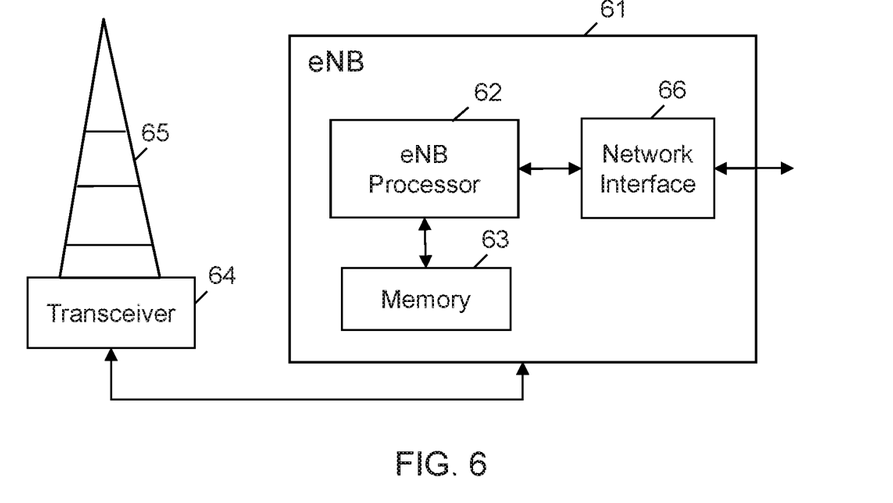
FIG. 6 is a schematic diagram of a base station in an exemplary embodiment of the present disclosure.

As shown in FIG. 6, the example radio access node (eNB 61) includes an eNB processor 62 coupled to a memory 63. When the processor executes computer program instructions stored in the memory, the processor is caused to control a transceiver 64, which transmits and receives RF signals through an antenna 65. The processor also controls a network interface 66 for communicating with other nodes in a wireless radio access network and/or with nodes in a core network. In particular embodiments, some or all of the functionality described above as being provided by a base station, a node B, an enhanced node B, and/or any other type of network node may be provided by the processor executing instructions stored on a computer-readable medium, such as the memory shown in FIG. 6.

Alternative embodiments of the radio access node may include additional components responsible for providing additional functionality, including any of the functionality identified above and/or any functionality necessary to support the solution described above.

Embodiments of the present disclosure may be implemented by a computer program product stored on a computer readable storage medium. The computer program product may include instructions which, when executed on at least one processor, cause the at least one processor to carry out the processes shown in FIGS. 2-4, and described in the accompanying text.

Embodiments may also be implemented by hardware modules or a combination of hardware modules and software modules. For example, the UE may include hardware and software modules for carrying out one or more of the processes described in FIGS. 2-4, and described in the accompanying text. The eNB may have similar modules.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method in a first User Equipment for transmitting device-to-device synchronization signals or broadcast channels in a wireless network, said method comprising:

determining, at the first User Equipment which is outside a network coverage, the first User Equipment's level of interest in being received by a second User Equipment for purposes of establishing a relayed route for the first User Equipment through the second User Equipment to the network coverage, wherein the second User Equipment is within the network coverage; and adapting, at the first User Equipment, a time pattern for transmission of synchronization signals or broadcast channels, depending on the determined level of interest of the first User Equipment, wherein determining the first User Equipment's level of interest includes:

analyzing a type of service that the first User Equipment is interested in performing, and concluding the first User Equipment is interested in being received by the second User Equipment only when the first User Equipment is interested in performing a certain type of service;

wherein the first User Equipment is outside network coverage, and the step of determining the first User Equipment's level of interest includes determining whether the first User Equipment is interested in performing commercial discovery or Public Safety discovery, wherein the time pattern for transmission of synchronization signals or broadcast channels is different for commercial discovery and Public Safety discovery; and wherein the step of adapting the time pattern for transmission includes selecting an appropriate time pattern based on the determination of whether the first User Equipment is interested in performing commercial discovery or Public Safety discovery.

2. A method in a first User Equipment for transmitting device-to-device synchronization signals or broadcast channels in a wireless network, said method comprising:

determining, at the first User Equipment which is outside a network coverage, the first User Equipment's level of interest in being received by a second User Equipment for purposes of establishing a relayed route for the first User Equipment through the second User Equipment to the network coverage, wherein the second User Equipment is within the network coverage; and adapting, at the first User Equipment, a time pattern for transmission of synchronization signals or broadcast channels, depending on the determined level of interest of the first User Equipment, wherein determining the first User Equipment's level of interest includes:

analyzing a type of service that the first User Equipment is interested in performing, and concluding the first User Equipment is interested in being received by the second User Equipment only when the first User Equipment is interested in performing a certain type of service;

wherein, based on a determination that the second User Equipment uses a different synchronization reference and is outside a coverage area of an eNodeB, adapting the time pattern includes periodically transmitting synchronization signals or broadcast channels only during a device-to-device interval or until the first User Equipment changes its relay preference.

3. A method in a first User Equipment for transmitting device-to-device synchronization signals or broadcast channels in a wireless network, said method comprising:

determining, at the first User Equipment which is outside a network coverage, the first User Equipment's level of interest in being received by a second User Equipment for purposes of establishing a relayed route for the first User Equipment through the second User Equipment to the network coverage, wherein the second User Equipment is within the network coverage; and adapting, at the first User Equipment, a time pattern for transmission of synchronization signals or broadcast channels, depending on the determined level of interest of the first User Equipment, wherein determining the first User Equipment's level of interest includes:

analyzing a type of service that the first User Equipment is interested in performing, and concluding the first User Equipment is interested in being received by the second User Equipment only when the first User Equipment is interested in performing a certain type of service;

wherein, based on a determination that the second User Equipment uses a different synchronization reference and is inside a coverage area of an eNodeB, adapting the time pattern includes:

receiving a synchronization reference signal from the second User Equipment;

determining whether the synchronization reference signal originated from the eNodeB;

based on the determination that the synchronization reference signal originated from the eNodeB, performing one of:

transmitting synchronization signals or broadcast channels only at a time coinciding with a discovery resource pool; or refraining from transmitting any synchronization signals or broadcast channels; and based on a determination that the synchronization reference signal did not originate from the eNodeB, periodically transmitting synchronization signals or broadcast channels.

4. A method in a first User Equipment for transmitting device-to-device synchronization signals or broadcast channels in a wireless network, said method comprising:

determining, at the first User Equipment, the first User Equipment's level of interest in being received by a second User Equipment that is within network coverage; and adapting, at the first User Equipment, a time pattern for transmission of synchronization signals or broadcast channels, depending on the determined level of interest of the first User Equipment, wherein determining the first User Equipment's level of interest includes:
  determining whether the second User Equipment is inside a coverage area of an eNodeB;
  based on the determination that the second User Equipment is inside the coverage area of the eNodeB, determining whether the second User Equipment is capable of relaying a synchronization reference that originated from the eNodeB; and
  based on the determination that the second User Equipment is capable of relaying the synchronization reference that originated from the eNodeB, determining the first User Equipment is interested when the first User Equipment desires to synchronize with the eNodeB.

5. The method as recited in claim 4, wherein, based on a determination that the second User Equipment uses the same synchronization reference, adapting the time pattern includes performing one of:
  transmitting synchronization signals or broadcast channels only at a time coinciding with a discovery resource pool; or
  refraining from transmitting any synchronization signals or broadcast channels.

6. The method as recited in claim 4, wherein, based on a determination that the second User Equipment uses a different synchronization reference and is inside a coverage area of an eNodeB, adapting the time pattern includes:
  receiving a synchronization reference signal from the second User Equipment;
  determining whether the synchronization reference signal originated from the eNodeB;
  based on the determination that the synchronization reference signal originated from the eNodeB, preforming one of:
    transmitting synchronization signals or broadcast channels only at a time coinciding with a discovery resource pool; or
    refraining from transmitting any synchronization signals or broadcast channels; and
  based on the determination that the synchronization reference signal did not originate from the eNodeB, periodically transmitting synchronization signals or broadcast channels.

7. An apparatus in a first User Equipment for transmitting device-to-device synchronization signals or broadcast channels in a wireless network, said apparatus comprising:
  a transceiver; and
  a processor coupled to a non-transitory memory that stores computer program instructions, wherein the processor executes the instructions, the processor controls:
    an interest determining circuit configured to determine while the first user equipment is outside a network coverage the first User Equipment's level of interest in being received by a second User Equipment for purposes of establishing a relayed route for the first User Equipment through the second User Equipment to the network coverage, wherein the second User Equipment is within the network coverage; and
    a transmission time pattern adapting circuit configured to adapt a time pattern for transmission of synchronization signals or broadcast channels, depending on the determined level of interest of the first User Equipment,
  wherein the interest determining circuit is configured to determine the first User Equipment's level of interest by:
    analyzing a type of service that the first User Equipment is interested in performing; and
    concluding the first User Equipment is interested in being received by the second User Equipment only when the first User Equipment is interested in performing a certain type of service;
  wherein the first User Equipment is outside network coverage, and the interest determining circuit is further configured to determine the first User Equipment's level of interest by determining whether the first User Equipment is interested in performing commercial discovery or Public Safety discovery, wherein the time pattern for transmission of synchronization signals or broadcast channels is different for commercial discovery and Public Safety discovery; and
  wherein the transmission time pattern adapting circuit is configured to adapt the time pattern for transmission by selecting an appropriate time pattern based on the determination of whether the first User Equipment is interested in performing commercial discovery or Public Safety discovery.

8. An apparatus in a first User Equipment for transmitting device-to-device synchronization signals or broadcast channels in a wireless network, said apparatus comprising:
  a transceiver; and
  a processor coupled to a non-transitory memory that stores computer program instructions, wherein the processor executes the instructions, the processor controls:
    an interest determining circuit configured to determine the first User Equipment's level of interest in being received by a second User Equipment; and
    a transmission time pattern adapting circuit configured to adapt a time pattern for transmission of synchronization signals or broadcast channels, depending on the determined level of interest of the first User Equipment,
  wherein the interest determining circuit is configured to determine the first User Equipment's level of interest by:
    determining whether the second User Equipment is inside a coverage area of an eNodeB;
    based on the determination that the second User Equipment is inside the coverage area of the eNodeB, determining whether the second User Equipment is capable of relaying a synchronization reference that originated from the eNodeB; and
    based on the determination that the second User Equipment is capable of relaying the synchronization reference that originated from the eNodeB, determining the first User Equipment is interested when the first User Equipment desires to synchronize with the eNodeB.

9. A system for adapting a first User Equipment's transmission time pattern for transmitting device-to-device synchronization signals or broadcast channels in a wireless communication network, said system comprising:
  a second User Equipment; and
  an apparatus in the first User Equipment, comprising:
    a processor configured to execute computer program instructions stored in a non-transitory memory;
    an interest determining circuit controlled by the processor and configured to determine while the first User Equipment is outside a network coverage the first User Equipment's level of interest in being received by a second User Equipment for purposes of establishing a relayed route for the first User Equipment through the second User Equipment to the network coverage, wherein the second User Equipment is within the network coverage; and a transmission time pattern adapting circuit controlled by the processor and configured to adapt a time pattern for transmission of synchronization signals or broadcast channels, depending on the determined level of interest of the first User Equipment, wherein the interest determining circuit is configured to determine the first User Equipment's level of interest by:

analyzing a type of service that the first User Equipment is interested in performing; and concluding the first User Equipment is interested in being received by the second User Equipment only when the first User Equipment is interested in performing a certain type of service;

wherein the first User Equipment is outside network coverage, and the interest determining circuit is further configured to determine the first User Equipment's level of interest by determining whether the first User Equipment is interested in performing commercial discovery or Public Safety discovery, wherein the time pattern for transmission of synchronization signals or broadcast channels is different for commercial discovery and Public Safety discovery; and wherein the transmission time pattern adapting circuit is configured to adapt the time pattern for transmission by selecting an appropriate time pattern based on the determination of whether the first User Equipment is interested in performing commercial discovery or Public Safety discovery.

10. A system for adapting a first User Equipment's transmission time pattern for transmitting device-to-device synchronization signals or broadcast channels in a wireless communication network, wherein the first User Equipment is operating outside a coverage area of an eNodeB in the wireless communication network, said system comprising:

a second User Equipment that provides a relay to an eNodeB; and an apparatus in the first User Equipment, comprising:

a processor configured to execute computer program instructions stored in a non-transitory memory;

an interest determining circuit controlled by the processor and configured to determine the first User Equipment's level of interest in being received by a second User Equipment; and a transmission time pattern adapting circuit controlled by the processor and configured to adapt a time pattern for transmission of synchronization signals or broadcast channels, depending on the determined level of interest of the first User Equipment, wherein the interest determining circuit is configured to determine the first User Equipment's level of interest by:

determining whether the second User Equipment is inside the coverage area of the eNodeB by analyzing the information received from the second User Equipment regarding whether the second User Equipment is operating inside or outside the coverage area of the eNodeB;

based on the determination that the second User Equipment is inside the coverage area of the eNodeB, determining whether the second User Equipment is capable of relaying a synchronization reference that originated from the eNodeB; and based on the determination that the second User Equipment is capable of relaying the synchronization reference that originated from the eNodeB, determining the first User Equipment is interested when the first User Equipment desires to synchronize with the eNodeB.

11. The method as recited in claim 1, wherein the first User Equipment is a Machine Type Communication (MTC) device.

12. The apparatus as recited in claim 7, wherein the first User Equipment is a Machine Type Communication (MTC) device.

13. The system as recited in claim 9, wherein the first User Equipment is a Machine Type Communication (MTC) device.

* * * * *